(12) United States Patent
Sweatt

(10) Patent No.: US 7,715,098 B1
(45) Date of Patent: May 11, 2010

(54) PROJECTION SCREEN HAVING REDUCED AMBIENT LIGHT SCATTERING

(75) Inventor: William C. Sweatt, Albuquerque, NM (US)

(73) Assignee: The United States of America as represented by the United States Department of Energy, Washington, DC (US)

(*) Notice: Subject to any disclaimer, the term of this patent is extended or adjusted under 35 U.S.C. 154(b) by 265 days.

(21) Appl. No.: 12/028,270

(22) Filed: Feb. 8, 2008

(51) Int. Cl.
G03B 21/60 (2006.01)

(52) U.S. Cl. ...................... 359/455; 359/459

(58) Field of Classification Search ............... 359/443, 359/455–456, 459, 449
See application file for complete search history.

(56) References Cited

U.S. PATENT DOCUMENTS

| 3,126,788 | A | * | 3/1964 | Hourdiaux | 359/451 |
| 3,180,214 | A | * | 4/1965 | Fox | 359/455 |
| 3,502,389 | A | * | 3/1970 | Hilborn | 359/459 |
| 3,598,470 | A | * | 8/1971 | Vetter | 359/455 |
| 3,704,055 | A | * | 11/1972 | Hong | 359/455 |
| 5,696,625 | A | | 12/1997 | Malifaud et al. | |
| 5,903,392 | A | | 5/1999 | Kojima et al. | |
| 6,040,941 | A | | 3/2000 | Miwa et al. | |
| 6,597,501 | B2 | | 7/2003 | Lambert et al. | |
| 6,600,600 | B2 | | 7/2003 | Chen | |
| 6,724,529 | B2 | | 4/2004 | Sinkoff | |
| 6,822,792 | B2 | | 11/2004 | Goto | |
| 2002/0171930 | A1 | | 11/2002 | Sekiguchi | |
| 2003/0197932 | A1 | | 10/2003 | Sinkoff | |
| 2004/0070824 | A1 | | 4/2004 | Toda et al. | |
| 2004/0104663 | A1 | | 6/2004 | Umeya et al. | |
| 2004/0233524 | A1 | | 11/2004 | Lippey et al. | |
| 2004/0240053 | A1 | | 12/2004 | Shimoda | |

* cited by examiner

*Primary Examiner*—Christopher Mahoney
(74) *Attorney, Agent, or Firm*—Thomas S. O'Dwyer; James C. Durkis; Paul A. Gottlieb

(57) ABSTRACT

An apparatus and method for improving the contrast between incident projected light and ambient light reflected from a projection screen are described. The efficiency of the projection screen for reflection of the projected light remains high, while permitting the projection screen to be utilized in a brightly lighted room. Light power requirements from the projection system utilized may be reduced.

25 Claims, 3 Drawing Sheets

PROJECTION SCREEN HAVING REDUCED AMBIENT LIGHT SCATTERING

FIELD OF THE INVENTION

The present invention relates generally to projection screens and, more particularly, to projection screens having improved contrast between reflected projected light and ambient light.

BACKGROUND OF THE INVENTION

Image projection systems, such as slide projectors, viewgraph machines, digital projectors, and motion picture projectors are in wide use. The screens currently employed with these devices require a darkened environment. Further, the greater the amount of ambient light, the greater the light output power required to maintain the contrast at a constant value.

Typically, an image projection system includes a projector unit and a beaded screen upon which an image is projected. The light source in a conventional projector is an incandescent bulb or an arc lamp, both sources emitting an approximately black-body spectrum. The beaded screen backscatters all wavelengths toward the viewers, and does not work well in well-lighted environments because the screen also reflects the ambient light, which may diminish the clarity of the projected image.

Recently designed screens can be used in well-lighted environments if the projector light source generates three narrow-band wavelengths (red, green and blue). The screen utilizes dyes for absorbing the light spectrum between the laser or light-emitting diode (LED) emissions. Other designs use multilayer reflective stacks self-assembled photonic lattices that only reflect the laser or LED radiation. However, narrow-banded light sources (LEDs and lasers) are either low power devices or are expensive.

SUMMARY OF THE INVENTION

Accordingly, it is an object of the present invention to provide a projection screen having improved contrast between reflected projected light and ambient light.

Another object of the invention is to provide a projection screen having improved contrast between projected light and ambient light, while maintaining high efficiency for reflection of the projected light therefrom.

Still another object of the invention is to provide a projection screen having improved contrast between projected light and ambient light such that the light power of the projected light can be reduced.

Yet another object of the invention is to provide a projection screen having improved contrast between projected light and ambient light such that the projection screen can be used in a lighted ambient environment.

Additional objects, advantages and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the projection screen having increased contrast between reflected projected light and ambient light incident thereon, hereof, includes in combination: a plurality of optical elements, each optical element including a lens disposed on a forward surface of the projection screen effective for receiving the projected light and for focusing the light at first chosen distance therefrom along a first optical axis, the lens having a forward surface facing the incident light, a portion of the forward surface of the lens near the periphery thereof forming a facet; a reflective surface facing the incident light beam, centered along the first optical axis and tilted relative thereto effective for focusing the light beam at a second chosen distance therefrom along a second optical axis intersecting the first optical axis at the reflecting surface; whereby a first plane which intersects the facet is defined by the first optical axis and the second optical axis, and a second plane including the first optical axis and orthogonal to the first plane is defined; a first baffle disposed in the vicinity of the first chosen distance along the first optical axis on the opposing side of the second plane from the facet, for blocking light; and a second baffle disposed approximately at the second chosen distance from the reflecting surface, and having a hole therein for permitting focused light reflected from the reflective surface to pass therethrough and emerge through the forward surface of the lens through the facet.

In another aspect of the present invention and in accordance with its objects and purposes, the method for increasing the contrast between reflected projected light and ambient light incident on a projection screen, hereof, includes the steps of: directing the projected light onto a plurality of lenses effective for focusing the light beam a first chosen distance therefrom along a first optical axis of each lens, each lens further having a facet near the periphery of the surface thereof; blocking ambient light from passing beyond each first chosen distance; focusing light reflected from a plurality of surfaces facing the projected light beam, one surface being centered along the first optical axis for each lens and being tilted relative to this axis, along a second optical axis at a second chosen distance therefrom; and blocking ambient light from passing beyond the second chosen distance and emerging through the facet in each of the lenses.

Benefits and advantages of the present projection screen include, but are not limited to, providing high contrast between reflected projected light and ambient light while maintaining high efficiency for reflection of the projected light, thereby permitting the projection screen to be used in brightly lighted rooms. Additionally, the present invention permits lower light power projection systems to be employed.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION OF THE INVENTION

Briefly, the present invention includes an angularly sensitive projection screen that absorbs light not generated by the projection device. Light having a small solid angle and derived from the projection device is caused to diverge into a larger beam at the location of the viewers, whereas light arriving at the screen from elsewhere, for example, through an exit facet in a focusing lens, is directed to two or more absorbing surfaces within the screen. That is, the screen appears to be black except for light received from the projection device.

In order to achieve this result, the projection screen hereof includes a multiplicity of optical elements which reflect based on the angle of incidence of light thereon from a projection device. Such optical elements may include a forward-facing focusing lens, a first black screen or baffle which blocks and absorbs light arriving from above the projection apparatus, a curved mirror surface behind the baffle which may be aspheric, for directing the light toward an exit facet in the face of the focusing lens and for focusing the light through a second black screen or baffle having an aperture before it exits the facet toward the viewing audience. The aperture in the second baffle may be small since the focus there may be tight. The facet may be tilted such that the exiting light is centered on the audience. The surface of the facet may be curved or toroidal such that the exit beam shape is matched to the audience.

The forward-facing lens in the optical elements may be round, but a more efficient geometry, such as a hexagonal cross section is envisioned. The sloped facet is the only wasted area and with an estimated size of about 10% of the area of the lens, about 90% of the light directed toward the screen from the projector being processed by the present apparatus and reflected in the direction of the audience. The two transmissive surfaces and the rear reflective surface will likely degrade the performance by another 4% giving a total efficiency of about 85%. The apertures may be absorbing material such that light entering the optical elements from other than on axis with the light from the projection apparatus (toward which each optical element is directed) will be absorbed. It should be noted that the optical elements will be tilted in the screen such that this condition is met dependant on where the projection apparatus is located relative to the screen. The apertures in the baffles may be chosen such that the projector can be misaligned by as much as about 5° relative to the screen which also permits some variation in the screen's optical parameters due to temperature variations. The facets may be tilted or sloped to direct the light to an audience located away from the projector.

Figure 1A:
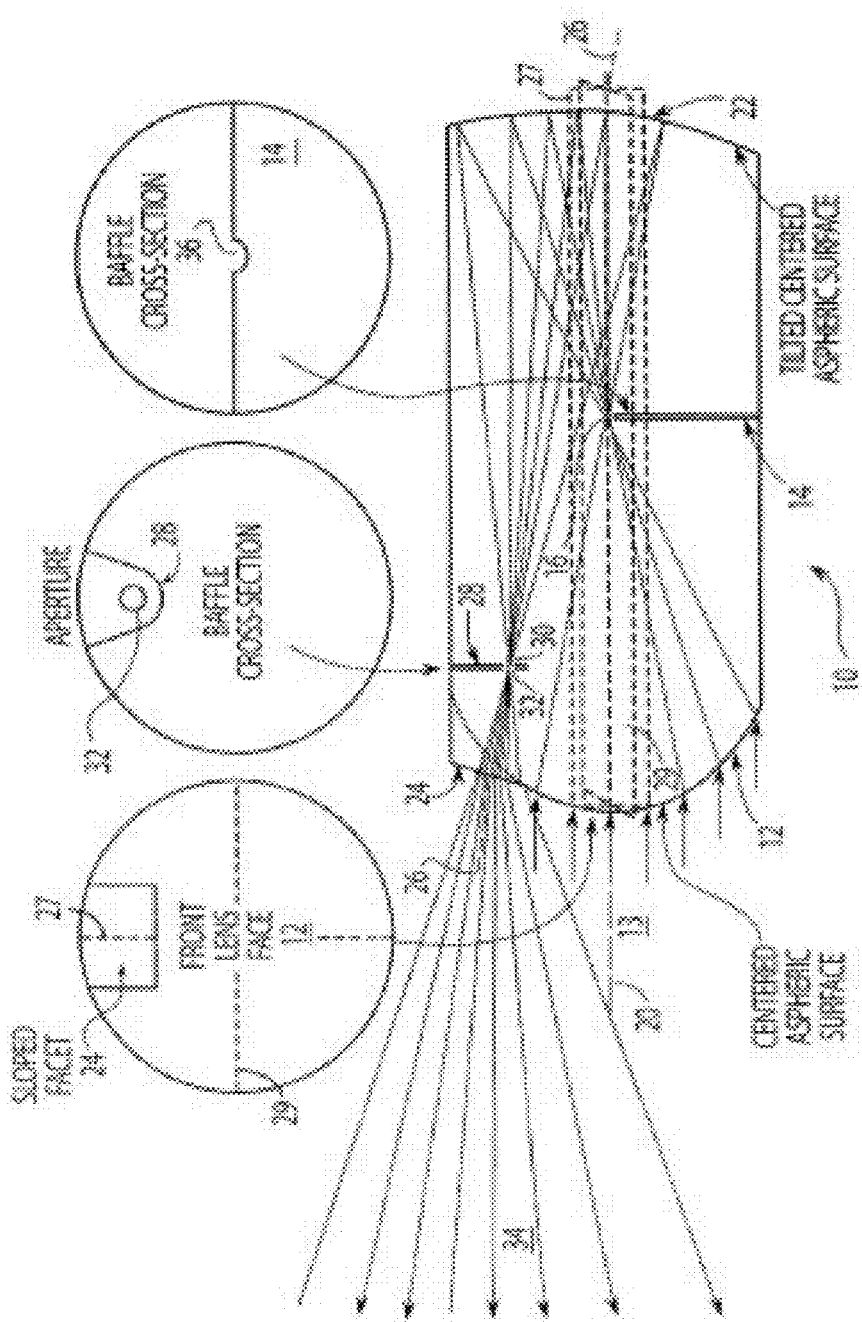
FIG. 1A is a schematic representation of a side view of one optical element of the projector screen of the present invention showing a forward facing lens for receiving light from the projection apparatus, a first light-absorbing baffle/aperture placed at the optical focus of the forward facing lens for blocking all incoming unfocused light below a plane containing the optical axis of the forward facing lens, a tilted, focusing reflective surface behind the first baffle for directing and focusing the light toward a sloped facet in the forward facing lens, and a second light-absorbing baffle/aperture placed at the focus of the focusing reflective surface.

Reference will now be made in detail to the present embodiments of the invention, examples of which are illustrated in the accompanying drawings. In the FIGURES, similar structure will be identified using identical reference characters. Turning now to FIG. 1A, a schematic representation of a side view of an embodiment of optical element, of the projector screen of the present invention is shown; the projector screen includes a plurality of such elements. Lens, 12, receives light, 13, from the projection apparatus. First (rear) light-absorbing baffle/aperture, 14, placed at optical focus, 16, of lens 12 blocks incoming ambient light entering the optical elements on one side of optical axis, 20, of lens 12. Tilted, focusing reflective surface, 22, may be formed on the inside surface of the rear surface of the projector screen, and directs and focuses light incident thereon toward facet, 24, formed on the front surface of lens 12, along second optical axis, 26, which intersects first optical axis 20 on reflective surface 22. First plane, 27, formed by first optical axis 20 and second optical axis 26 intersects facet 24.

Second (forward) light-absorbing baffle/aperture, 28, disposed on the opposite side of second plane, 29, perpendicular to first plane 27 and containing first optical axis 20 from first (rear) baffle 14, is placed at focus, 30, of focusing reflective surface 22. Aperture, 32, may be formed in baffle/aperture 28 to improve its light blocking function. Notch, 36, may be formed in baffle 14 to improve its light blocking function, while permitting the majority of the focused light to reach reflective surface 22. The tilt angle of facet 24 relative to second optical axis 26 is selected such that light, 34, emerging therefrom may be directed to an audience in a chosen location, and may be between about 0° and about 30°. Although facet 24 is illustrated as having a flat front surface, curved surfaces (spherical, aspheric, toroidal, etc.) may be used to direct the signal to the entire viewing audience, depending on the intended use of the screen. As stated hereinabove, baffles 14 and 28 may be coated with a light-absorbing material. Reflective surface 22 may be coated with suitable metals to improve reflectivity. Lens 12 and reflective surface 22 may have approximately the same area, and may be aspheric. Reflective surface 22 may also be spherical. As stated hereinabove, first optical axis 20 of optical element 10 may be pointed in the direction of the projection apparatus; however, a tilt of as much as about 5° (cone angle) may be accommodated. It is anticipated that the optical cell may be fabricated from moldable glasses and/or plastics.

The sizes of the baffles and apertures will be chosen to maximize the contrast between incident ambient light and light from a projection apparatus reflected from the projection screen.

Figure 1B:
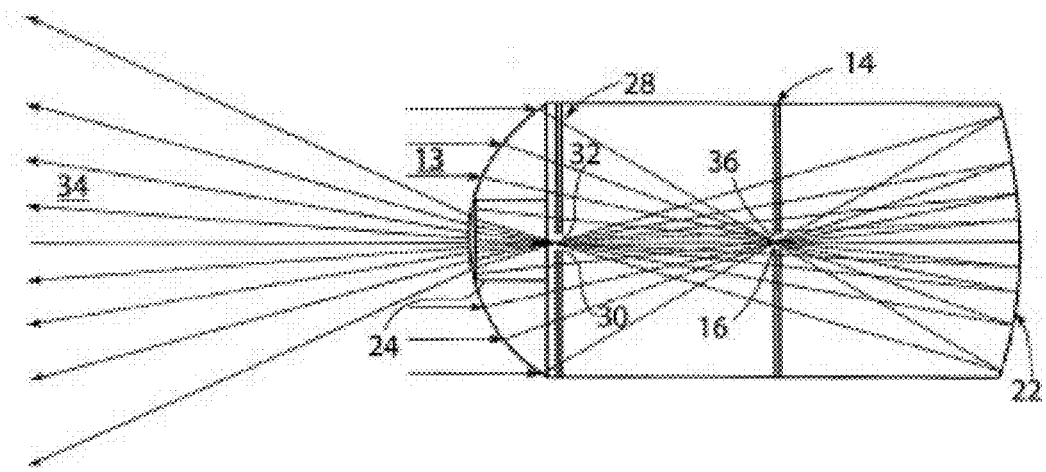
FIG. 1B is a schematic representation of a top view of the optical element illustrated in FIG. 1A hereof.
Figure 1C:
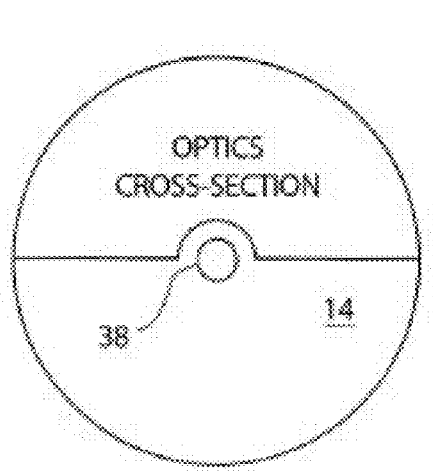
FIG. 1C is a schematic representation of a front view of a second embodiment of the first light-absorbing baffle/aperture illustrated in FIG. 1A hereof, wherein the baffle has an enclosed aperture.

FIG. 1B is a schematic representation of a top view of the optical element 10 illustrated in FIG. 1A hereof, while FIG. 1C is a schematic representation of the front view of a second embodiment of first light-absorbing baffle/aperture 14 illustrated in FIG. 1A hereof, wherein baffle 14 has an enclosed aperture, 38, in place of notch 36.

Figure 2:
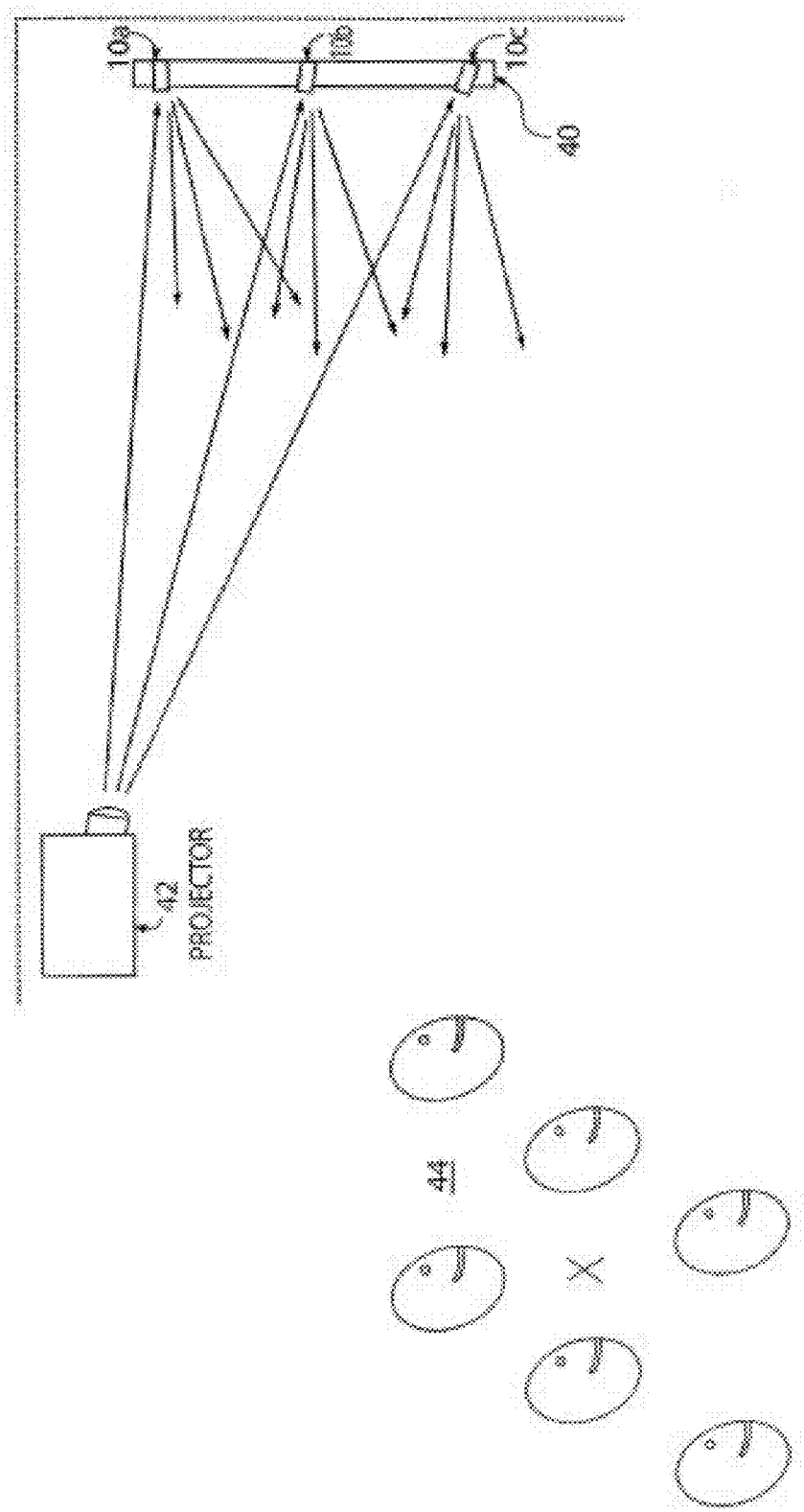
FIG. 2 is a schematic representation of an embodiment of the projection screen of the present invention showing three optical elements thereof illustrated in FIGS. 1A-1C hereof pointed toward the projection apparatus shown positioned above an audience.

FIG. 2 is a schematic representation of an embodiment of projection screen, 40, of the present invention showing three optical elements 10a-10c thereof illustrated in FIGS. 1A-1C hereof pointed toward projection apparatus, 42, shown as positioned above audience, 44. As stated, optical elements 10a-10c are pointed toward projection apparatus 42, and the tilts of the facets in lenses 12 thereof relative to the second optical axes are chosen such that light emerging from the facets is directed toward a chosen location in audience 44. The first optical axes of lenses 12 may be tilted by as much as 20° relative to a normal vector describing the orientation of the surface of the screen.

Fabrication of the individual optical cells may be achieved using suitable molds generated by diamond turning, the shapes of the aspheric lenses and reflective surfaces being readily cut. Lenses including facets, and reflective surfaces may be molded as independently produced portions, and glued together after the second and first baffles are suitably generated, respectively. Multiple lenses may be formed on one sheet, and multiple reflective surfaces may be formed on another sheet. The lenses might initially include material from which flat surfaces could be fashioned as second (forward) baffles, for example, using lithography. The reflective surfaces might be molded to include material from which flat surfaces could subsequently be generated for the first (rear) baffle, also for example, using lithography. First and second baffles might alternatively be fashioned on separate sheets. A planar structure may be generated to provide the proper spacing between the lenses/second baffles and the reflective surfaces/first baffles, and the three (four or five) surfaces glued together after alignment of the surface containing the lenses and second baffles with the surface containing the reflective surfaces and the first baffles.

Having generally described the invention, the following EXAMPLE provides additional details.

EXAMPLE

Assuming a cyclic olefin plastic (such as Zeonor E48R) as the material of construction, convex lens 12 may have a diameter of 0.500 mm, a radius of curvature of 0.2432 mm, a thickness of 0.7 mm, and a focal length of 0.48 mm; reflective surface 22 may have a diameter of 0.532 mm and a focal length of 0.44 mm; first baffle 14 and second baffle 28 may have thicknesses of a few tens of microns. The distance between lens 12 and reflective surface 22 may be about 1.2 mm. First aperture 38 may be about 25 μm, while second aperture 32 may be about 40 μm, which permits the projector to be placed within an approximately ±2° angle from the on-axis position. Facet 24 may have curvature or be flat. In the situation where the lens is toroidal, the exiting beam may be expanded or contracted to serve any sized audience without wasting light by illuminating too large of an area.

The plastic chosen for use in the EXAMPLE has moderately low dispersion and, coupled with the small size of each optical element, it is expected that the chromatic aberrations will be small. Lens 12 may be coated with a suitable anti-reflection coating. Reflective surface 22 may be coated with either silver or aluminum with a protective overcoat layer. As described, the light exiting the facets would have a divergence of about ±20° by about ±20°

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A projection screen having increased contrast between reflected projected light and ambient light incident thereon, comprising in combination:
    a plurality of optical elements, each optical element including a lens disposed on a forward surface of said projection screen effective for receiving the projected light and for focusing the light at first chosen distance therefrom along a first optical axis, said lens having a forward surface facing the incident light, a portion of the forward surface of said lens near the periphery thereof forming a facet;
    a reflective surface facing the incident light beam, centered along the first optical axis and tilted relative thereto effective for focusing the light beam at a second chosen distance therefrom along a second optical axis intersecting the first optical axis at said reflecting surface;
    whereby a first plane which intersects the facet is defined by the first optical axis and the second optical axis, and a second plane including the first optical axis and orthogonal to the first plane is defined;
    a first baffle disposed in the vicinity of the first chosen distance along the first optical axis on the opposing side of the second plane from the facet, for blocking light; and
    a second baffle disposed approximately at the second chosen distance from the reflecting surface, and having a hole therein for permitting focused light reflected from said reflective surface to pass therethrough and emerge through the forward surface of said lens through said facet.

2. The projection screen of claim 1, wherein said lens comprises an aspheric lens.

3. The projection screen of claim 2, wherein said lens comprises a circular lens.

4. The projection screen of claim 2, wherein said aspheric lens is hexagonal such that each of said plurality optical elements on said forward surface is placed closer to the optical elements adjacent thereto.

5. The projection screen of claim 1, wherein the facet on the surface of said plurality of lens has a flat surface oriented to refract the light emerging therethrough in a chosen direction.

6. The projection screen of claim 1, wherein said reflective surface comprises an aspheric surface or a spherical surface.

7. The projection screen of claim 6, wherein said reflective surface is coated with a reflective metal.

8. The projection screen of claim 6, wherein each of said lenses is anti-reflection coated.

9. The projection screen of claim 1, wherein said first baffle and said second baffle are effective for absorbing light incident thereon.

10. The projection screen of claim 1, wherein said first aperture has a hole located therein centered about the first optical axis.

11. The projection screen of claim 1, wherein the first optical axis is parallel to the projected light.

12. The projection screen of claim 1, wherein the first optical axis has an angle up to about 5° relative to the projected light.

13. The projection screen of claim 1, wherein the size of said lens in each of said plurality of optical elements is chosen such that there is no observed granularity of the projected light exiting the facets.

14. A method for increasing the contrast between reflected projected light and ambient light incident on a projection screen, comprising the steps of:
    directing the projected light onto a plurality of lenses effective for focusing the light beam a first chosen distance therefrom along a first optical axis of each lens, each lens further having a facet near the periphery of the surface thereof;
    blocking ambient light from passing beyond each first chosen distance;
    focusing light reflected from a plurality of surfaces facing the projected light beam, one surface being centered along the first optical axis for each lens and being tilted relative to this axis, along a second optical axis at a second chosen distance therefrom; and
    blocking ambient light from passing beyond the second chosen distance and emerging through the facet in each of the lenses.

15. The method of claim 14, wherein each of the plurality of lenses is an aspheric lens.

16. The method of claim 15, wherein each of the lenses is a circular lens.

17. The method of claim 15, wherein each of the plurality of lenses is hexagonal such that each lens fits closer to lenses adjacent thereto.

18. The method of claim 14, wherein each facet on the surface of each of the plurality of lenses has a flat surface oriented to direct light exiting therefrom in a chosen direction.

19. The method of claim 14, wherein each of the reflective surfaces is an aspheric surface or a spherical surface.

20. The method of claim 19, wherein each of the plurality of reflective surfaces is coated with a reflective metal.

21. The method of claim 19, wherein each of said lenses and each of said reflective surfaces is anti-reflection coated.

22. The method of claim 14, wherein said step of blocking ambient light from passing beyond the first chosen distance, and said step of blocking unfocused light from passing beyond the second chosen distance is achieved using baffles effective for absorbing light.

23. The method of claim 14, wherein the size of each lens in the plurality lenses is chosen such that there is no observed granularity of the projected light exiting the facets.

24. The method of claim 14, wherein the first optical axis is parallel to the projected light.

25. The method of claim 14, wherein the first optical axis has an angle up to about 5° relative to the projected light.

* * * * *